United States Patent [19]

Okada et al.

[11] Patent Number: 5,959,771

[45] Date of Patent: *Sep. 28, 1999

[54] LENS SYSTEM

[75] Inventors: Takashi Okada; Hideki Nagata, both of Sakai, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/690,916

[22] Filed: Aug. 1, 1996

[30] Foreign Application Priority Data

Aug. 7, 1995 [JP] Japan .................................. H 7-200861
Jul. 2, 1996 [JP] Japan .................................. H 8-172135

[51] Int. Cl.⁶ .............................. G03B 13/06; G02B 9/08
[52] U.S. Cl. ............................ 359/434; 359/432; 359/740
[58] Field of Search ..................................... 359/362–363, 359/368, 379, 380, 385, 388, 422, 434–435, 738–740; 396/227, 257, 260, 73, 79; 348/341, 335, 363

[56] References Cited

U.S. PATENT DOCUMENTS

| | | | |
|---|---|---|---|
| 3,918,798 | 11/1975 | Takano ....................................... | 359/740 |
| 4,159,864 | 7/1979 | Yasukuni et al. ........................ | 359/740 |
| 4,548,481 | 10/1985 | Yamada .................................... | 359/379 |
| 4,840,474 | 6/1989 | Heft et al. ............................... | 359/434 |
| 4,867,549 | 9/1989 | Sekine ...................................... | 359/434 |
| 5,321,457 | 6/1994 | Imaizumi ................................. | 359/434 |
| 5,363,163 | 11/1994 | Hayashi et al. ......................... | 396/373 |
| 5,444,569 | 8/1995 | Broome .................................... | 359/435 |
| 5,459,511 | 10/1995 | Uehara et al. ........................... | 348/335 |
| 5,646,788 | 7/1997 | Bietry ...................................... | 359/740 |
| 5,703,716 | 12/1997 | Furuta ...................................... | 359/434 |
| 5,729,385 | 3/1998 | Nishida et al. .......................... | 359/434 |

FOREIGN PATENT DOCUMENTS

7-35986   2/1995  Japan ..................................... 359/380
7-253537  10/1995  Japan .

*Primary Examiner*—Thong Nguyen
*Attorney, Agent, or Firm*—Burns, Doane, Swecker & Mathis, L.L.P.

[57] ABSTRACT

A relay lens system which may be used with, e.g., a video camera or still video camera so that these video cameras can use, as the image forming lens, various preexisting interchangeable image forming lenses originally designed for single lens reflex cameras. The image forming lenses which form a first image can have various exit pupils. The entry pupil of the relay lens system can be changed in accordance with each particular exit pupil by selecting one from a plurality of apertures or by a movable aperture. Consequently, a second image can be formed that reproduces the first image while maintaining good quality.

22 Claims, 6 Drawing Sheets

LENS SYSTEM

BACKGROUND OF THE INVENTION

1. Field of the Invention

The present invention pertains to a relay lens system, and more particularly to a relay lens system suitable for attachment to a video camera or a still video camera, that re-forms an image on, e.g., an electronic imaging device, etc., as a second image, a first image being formed by means of an image forming lens.

2. Description of the Related Art

Video cameras and still video cameras (SVCs) that convert images into digital signals for each pixel using a CCD, etc., are conventionally known. These cameras have drawn attention in recent years in particular as input devices to input images into image processors such as personal computers.

It would be very convenient if interchangeable lenses for single lens reflex cameras, which already exist in great numbers corresponding to various incident angles of view, could be employed as image forming lenses for these types of cameras. However, due to differences between the size of the image formed on the surface of the silver halide film and the size of the image formed on the surface of an electronic imaging device (e.g., a CCD, etc.), interchangeable lenses for single lens reflex cameras can not be directly used as image forming lenses for video cameras, etc. Therefore, where an interchangeable lens for single lens reflex cameras is used, a relay lens system must be used to reduce the image formed by the interchangeable lens and re-form it onto the CCD.

Figure 4:
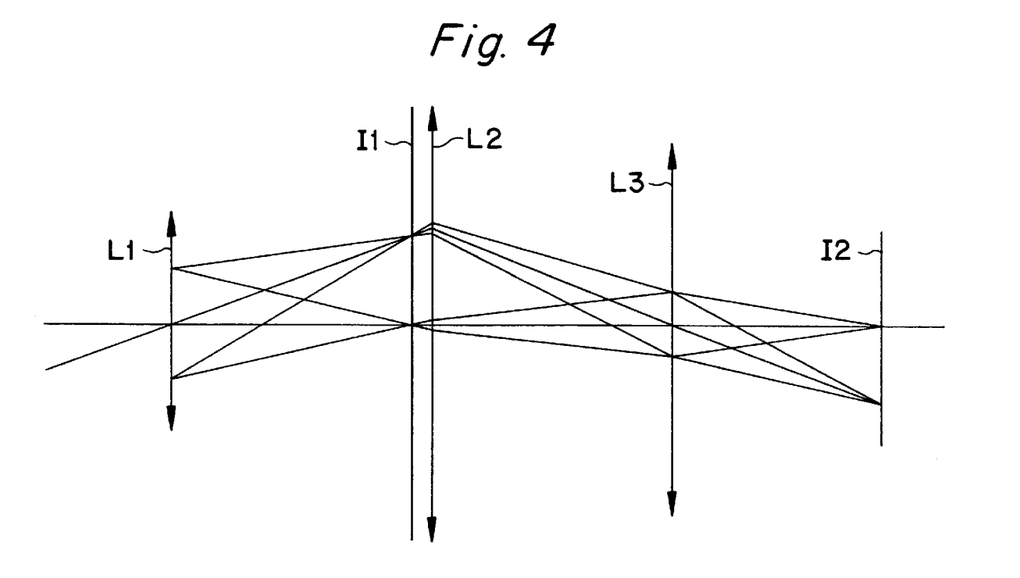
FIG. 4 is a schematic drawing showing a conventional relay lens system.

An optical system using this type of relay lens system is explained with reference to FIGS. 4 and 5. FIG. 4 is a simplified drawing showing the basic construction of an optical system employing a relay lens system, and FIG. 5 is a drawing of the optical path of an SVC using the optical system of FIG. 4.

Figure 5:
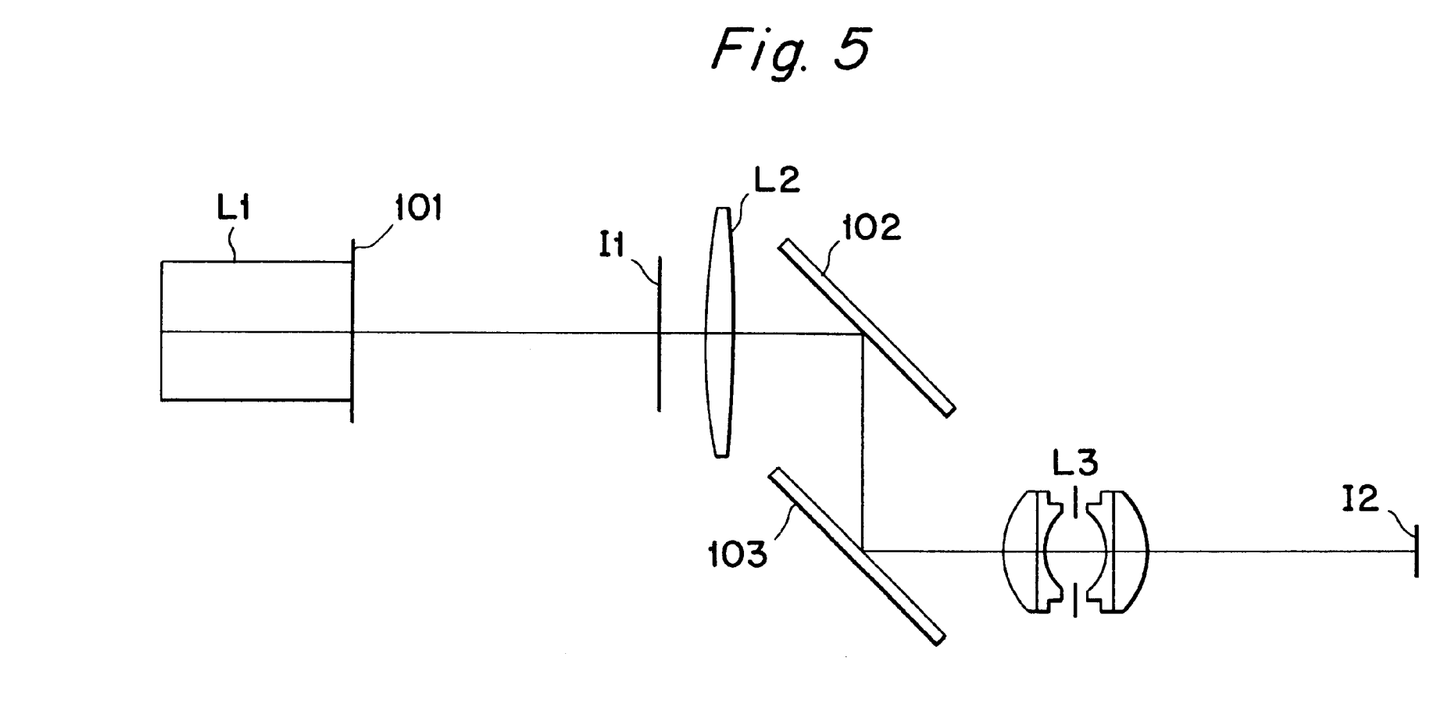
FIG. 5 is a schematic drawing of a SVC optical system in which the conventional relay lens system is applied.

In FIGS. 4 and 5, L1 is an interchangeable lens (image forming lens) for single lens reflex cameras, I1 is a first image plane, L2 is a field lens, L3 is a relay lens system, and I2 is a second image plane. In FIG. 5, 101 is a surface onto which the image forming lens L1 is mounted, and 102 and 103 are reflecting mirrors. In FIGS. 4 and 5, the light rays leaving the image forming lens L1 form an image at the first image plane I1. The light rays that formed the first image then strike the field lens L2. The field lens L2 is a lens located near the first image plane I1 and has a positive refractive power. In addition to causing the light rays that formed the first image to converge toward the optical axis, the field lens L2 causes the light rays to strike the relay lens system L3. In other words, the field lens L2 is located such that the relay lens system L3 may be used with approximately the same angle of view as the image forming lens L1, i.e., the field lens L2 operates to coordinate the exit pupil of the image forming lens L1 with the entry pupil of the relay lens system L3. The light rays that are made to converge toward the optical axis by means of this field lens L2 are reduced and projected onto the second image plane I2 by the relay lens system L3 and form a second image.

However, this type of conventional relay lens system has problems. Generally, the position along the optical axis and size of the exit pupil of the image forming lens that forms the first image vary depending on the focal length and the F-number of the image forming lens. In addition, because the positions of the principal point and the exit pupil along the optical axis do not necessarily coincide, the position of the exit pupil may differ even where the focal length is the same.

Figure 6:
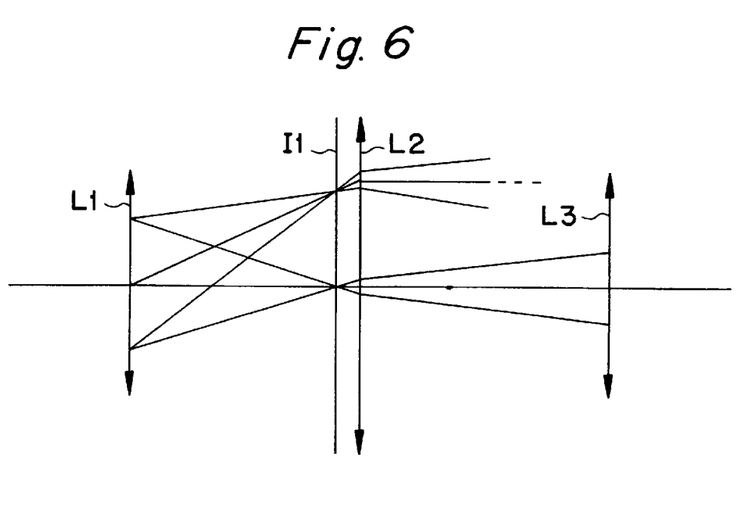
FIG. 6 is a schematic drawing to explain the problems with the conventional relay lens system.

Therefore, where the image forming lens L1 is replaced with a lens having a short focal length and a large exit pupil, there are cases where non-axial or marginal rays do not strike the relay lens system L3, as shown in FIG. 6. In such a case, i.e., where the exit pupil of the image forming lens and the entry pupil of the relay lens system do not substantially coincide, the amount of non-axial rays is reduced and the peripheral areas of the second image become dark. Therefore, in a conventional relay lens system having a single entry pupil, only image forming lenses whose exit pupil substantially coincides with the entry pupil of the relay lens system can be used.

To resolve this problem, it is possible to form a second image without the use of non-axial rays that do not strike the relay lens system. However, in this case, the size of the second image that can be transferred from the first image becomes smaller, which is not desirable.

It is also possible to give the field lens a variable refractive power. However, in order to do this, the large field lens would have to be moved, which would increase the size of the entire optical system. Moreover, if the field lens were moved, fluctuations in its aberrations would affect the image, which is not desirable.

SUMMARY

The object of the present invention is to resolve the problems described above.

Another object of the present invention is to provide a compact reduction/projection optical system (i.e., one which reduces and projects an image) in which a relay lens system is used.

Yet another object of the present invention is to provide a relay lens system that can work with image forming lenses that have various exit pupils.

Yet another object of the present invention is to provide a relay lens system that can transfer images while maintaining good quality and that works with image forming lenses that have various exit pupils.

These and other objects are attained by means of a relay lens system that re-forms as a second image a first image formed by the image forming lens, the relay lens system having a first entry pupil and a second entry pupil that differs from the first entry pupil, wherein said relay lens system uses one of these two entry pupils by switching from one to the other, and the entry pupil used by the relay lens system may be changed in size.

These and other objects are also attained by means of a relay lens system that re-forms as a second image a first image formed by the image forming lens, the relay lens system having an entry pupil that can be moved along the optical axis and that can be changed in size.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION

The relay lens system of the present invention will be described with reference to the drawings.

Figure 1A:
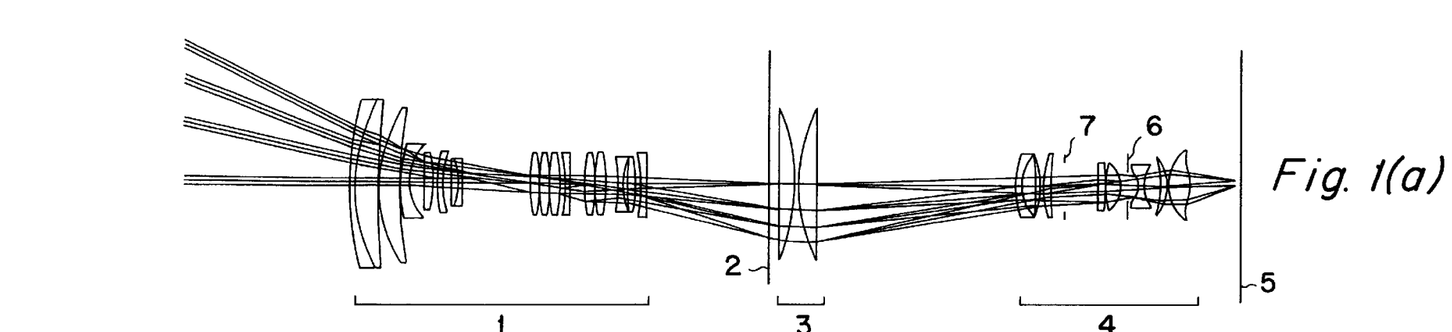
FIGS. 1(a)–1(c) are drawings of the optical path of the image forming optical system of a first embodiment of the invention showing a zoom lens in its shortest, middle and longest focal lengths, respectively.
Figure 1B:
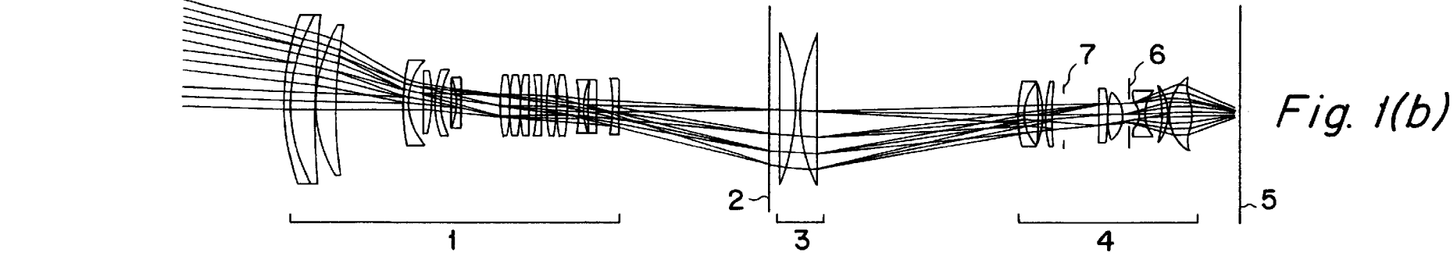
Figure 1C:
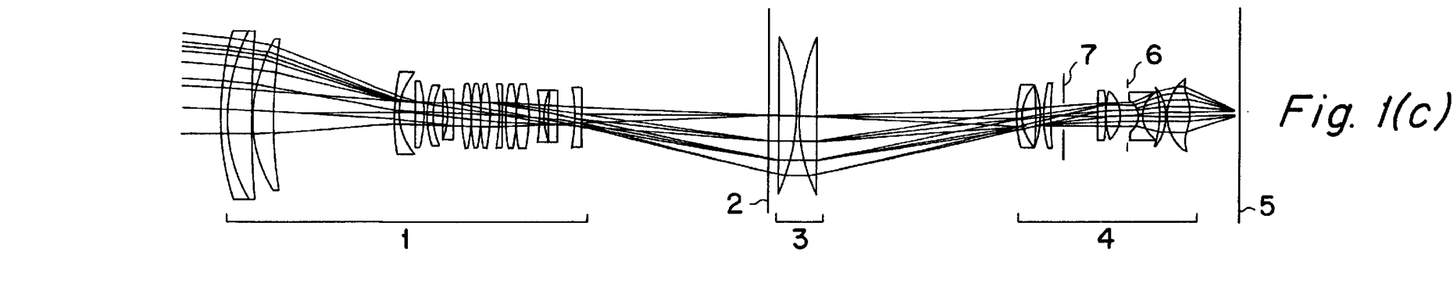

FIGS. 1(a)–1(c) are drawings of the optical path of the image forming optical system in which the relay lens system pertaining to the first embodiment is applied. In FIGS. 1(a)–1(c), an image forming lens 1, a field lens unit 3 which as an entire unit has a positive refractive power, and a relay lens system 4 are located in that order from the object side. An image is formed by the image forming lens 1 on a first image plane 2, and the image is then reformed by the relay lens system 4 on a second image plane 5 after passing through the field lens 3.

The relay lens system 4 is equipped with a first aperture 6 in the relay lens system 4 at a location toward the second image plane 5 and a second aperture 7 at a location toward the object side. The image forming lens 1 in FIG. 1 is a zoom lens in this example. FIG. 1(a) shows the case where the image forming lens 1 is in the shortest focal length condition, FIG. 1(b) shows the case where the image forming lens 1 is in the middle focal length condition, and FIG. 1(c) shows the case where the image forming lens 1 is in the longest focal length condition. The image forming lens 1 and the relay lens system 4 include a plurality of lenses, the design of which is dependent on the overall optical system, the focal length, F-number and angle of view of the image forming lens 1, etc. The specific design is chosen by factors beyond the scope of the present invention. Once the optical system is chosen which can achieve the desired results, then the location and diameters of the apertures in accordance with the present invention can be determined from knowledge within the skill level of artisans in the optical arts.

The first image is formed on the first image plane 2 by the image forming lens 1. The light rays that formed the first image are then made to converge toward the optical axis by the positive refractive power of the field lens 3, after which they strike the relay lens system 4. The relay lens system 4 excludes the unnecessary portion of the light rays by means of either the first aperture 6 or the second aperture 7, and then forms a second image on the second image plane 5.

In this embodiment, the first aperture 6 is used as the entry pupil for the relay lens system 4 where the image forming lens 1 is in the shortest or the middle focal length condition (FIGS. 1(a), 1(b)). On the other hand, the second aperture 7 is used as the entry pupil for the relay lens system 4 where the image forming lens 1 is in the longest focal length condition (FIG. 1(c)).

Figure 2:
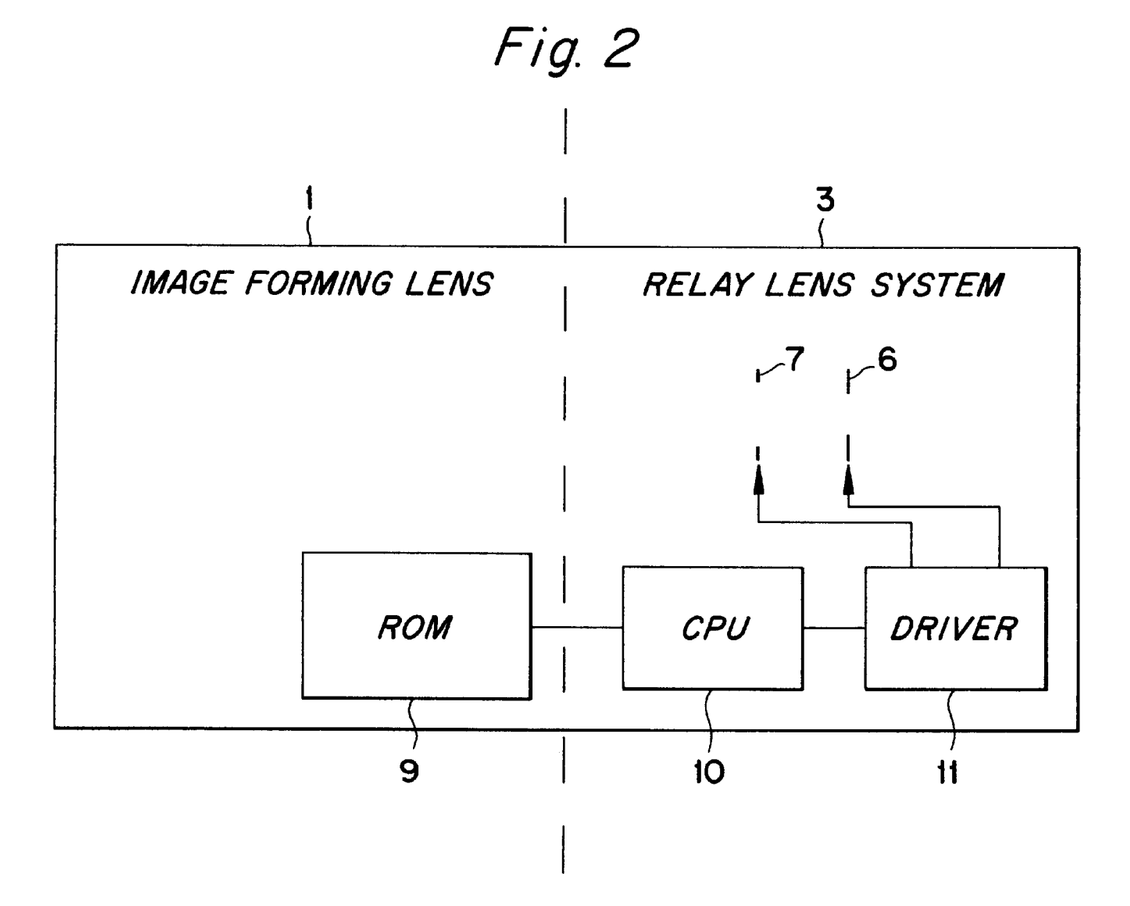
FIG. 2 is a representational block diagram showing the mechanism for generating and transmitting lens information from the image forming lens to the relay lens for selecting and adjusting the pupil of the relay lens.

Of the first and second apertures 6 and 7, the aperture that is not being used is set to be outside the effective aperture of the optical system such that it will not influence the light rays. For example, where the focal length of the image forming lens 1 is the shortest focal length, because the second aperture 7 is not used, it is set to be outside the effective aperture. Of the first and second apertures 6 and 7, the aperture that is used is adjusted in diameter as necessary in terms of the effective aperture in response to the zooming of the image forming lens 1 in this example. The different locations of the aperture makes a greater range of effective diameters available.

Where the image forming lens 1 is not mounted to the relay lens system 4, the first aperture 6 and the second aperture 7 are both set to an initial setting, e.g., the smallest aperture diameters. When the image forming lens 1 is mounted to the relay lens system 4, focal length information regarding image forming lens 1 is transmitted to relay lens system 4 at all times, and it is decided whether the first aperture 6 or the second aperture 7 is to be used. This lens information is generated in a ROM 9 or other suitable memory structure in the image forming lens 1, through electric contacts, to a microprocessor 10 in the relay lens system 4 as shown in FIG. 2, in a manner similar to the transmission of lens information to a camera body as generally known to those skilled in the art. FIG. 2 is a representational block diagram showing the ROM 9 which stores, generating and transmits lens information from the image forming lens 1 to the relay lens system 3. In the relay lens system 3, a microprocessor 10 selects the appropriate aperture 6 or 7 and adjusts the diameter of selected aperture 6 or 7 via an aperture driver 11. Naturally, this lens information can be deduced by the operator through visual indicators on the image forming lens 1, and the aperture 6 or 7 and aperture diameter of the selected aperture manually or mentally determined by the operator. The aperture diameter of the chosen aperture is then adjusted, and the diameter of the aperture not chosen is set to be outside the effective aperture of the relay lens system 4.

For example, where the image forming lens 1 is mounted to the relay lens system 4 and its focal length is the shortest focal length, that focal length information is transmitted to the relay lens system 4. As a result, the aperture diameter of the first aperture 6 is adjusted and the aperture diameter of the second aperture 7 is set to be outside the effective aperture of the relay lens system 4. When zooming from the shortest focal length to the middle focal length is performed, the effective aperture of the first aperture 6 is adjusted in response to the change in focal length. When the focal length of the image forming lens 1 exceeds the middle focal length, the aperture diameter of the second aperture 7 is adjusted and the aperture diameter of the first aperture 6 is set to be outside the effective aperture of the relay lens system 4. Similarly, where zooming of the image forming lens 1 from the middle focal length to the longest focal length is performed, the effective aperture of the second aperture 7 is adjusted in response to the change in focal length.

Where, unlike in the construction described above, the image forming lens 1 is not mounted to the relay lens system 4, it is also acceptable to set the first aperture 6 and the second aperture 7 to the largest aperture diameters. If this construction is adopted, when the image forming lens 1 is mounted and the aperture to be used is decided on, only adjustment of the aperture diameter of the chosen aperture will suffice.

As explained above, because either of two apertures 6 and 7 may be selectively used and the aperture diameter is also adjusted in response to the focal length of the image forming lens 1, the entry pupil for the relay lens system 4 may be changed to correspond to the exit pupil of the image forming lens 1 even where the exit pupil changes. As a result, the first image may be transferred to the second image while maintaining good quality.

In contrast, in the conventional relay lens system, because the position of the entry pupil cannot be changed —for example, if an aperture is formed at the position of the first aperture 6 so that it will be at the entry pupil position—the entry pupil does not coincide with the exit pupil of the image forming lens 1 in a condition close to the longest focal length condition, and the first image cannot be transferred to the second image while maintaining good quality.

While two apertures are used in the first embodiment described above, it is also acceptable to increase the number of apertures if a number of exit pupils are available for the image forming lens 1 and it is necessary that the aperture be coordinated with each of the several exit pupils.

The second embodiment of the present invention will now be explained.

The embodiment described above involved an example in which the apertures are fixed along the optical axis. However, where the position and size of the exit pupil of the image forming lens vary, it is desirable to prepare entry pupils for the relay lens system with attention to further details.

Figure 3:
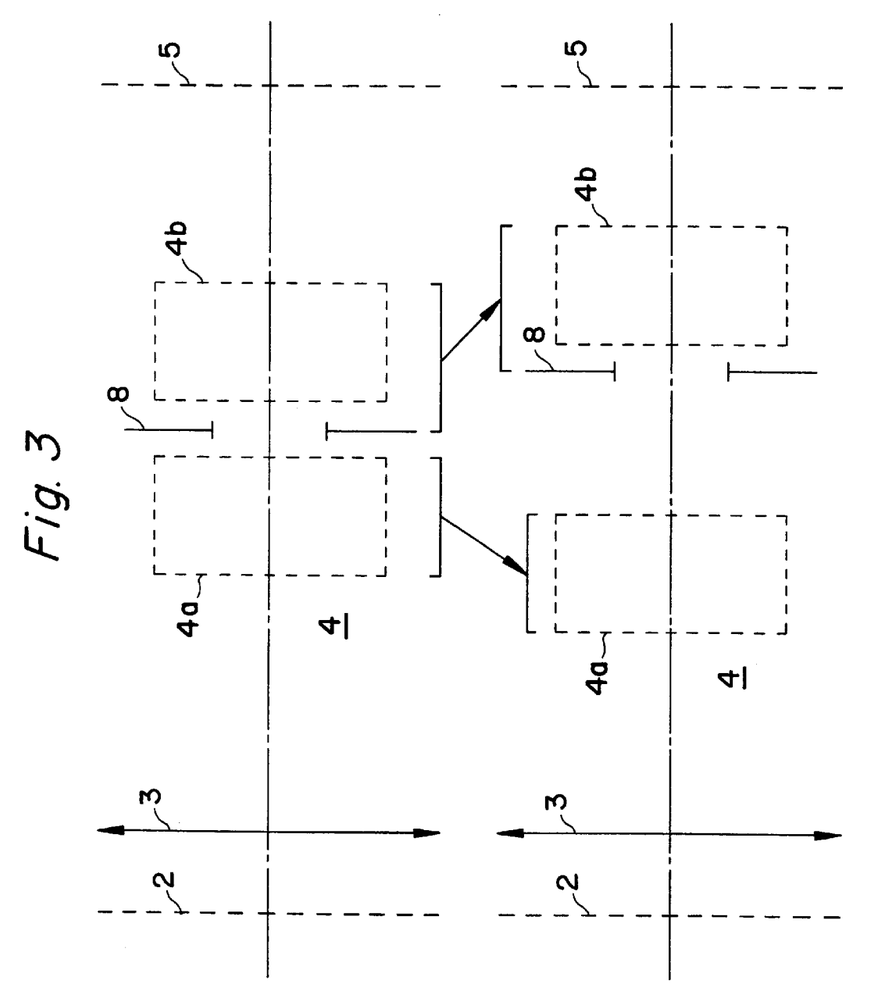
FIG. 3 is a schematic drawing of a second embodiment.

Accordingly, in the second embodiment, the entry pupil of the relay lens system is continuously changed by moving the aperture continuously along the optical axis. FIG. 3 is a schematic drawing showing one example of this type of relay lens system. Members indicated using the same numbers as in FIG. 1 function in the same manner in the embodiment shown in FIG. 3 as well. The relay lens system 4 comprises, from the object side, a first lens unit 4a, an aperture 8 and a second lens unit 4b in this order. The aperture 8 is fixed to the second lens unit 4b in this example.

In the relay lens system 4 of the second embodiment, the first lens unit 4a may be moved toward the object and the second lens unit 4b may be moved toward the image without changing the conjugate length and focal length. In other words, the relay lens system 4 has a fixed magnification. Since the aperture 8 is fixed to the second lens unit 4b, it moves along the optical axis together with the movement of the second lens unit 4b along the optical axis.

The aperture 8 is fixed to the second lens unit 4b so that it will move along the optical axis together with the second lens unit 4b, in order to maximize the amount of its movement. Increasing the amount of movement of the aperture 8 enables it to handle a wider variety of exit pupils of the image forming lens 1. However, since the second image must be projected at the same magnification at all times regardless of the magnification of the image forming lens 1, the first lens unit 4a is moved in accordance with the movement of the second lens unit 4b so that the conjugate length and focal length may be maintained at certain lengths.

The effective aperture of the aperture 8 may be adjusted in accordance with the exit pupil of the image forming lens 1. In this embodiment, the effective aperture of the aperture 8 is automatically changed in accordance with the focal length information from the image forming lens 1.

By giving the relay lens system 4 the construction described above, the entry pupil of the relay lens system 4 may be continuously changed. Therefore, the most appropriate entry pupil for the relay lens system may be selected in response to the exit pupil of the image forming lens 1, and the second image reproduces the first image while maintaining good quality may be formed.

Figure 3A:
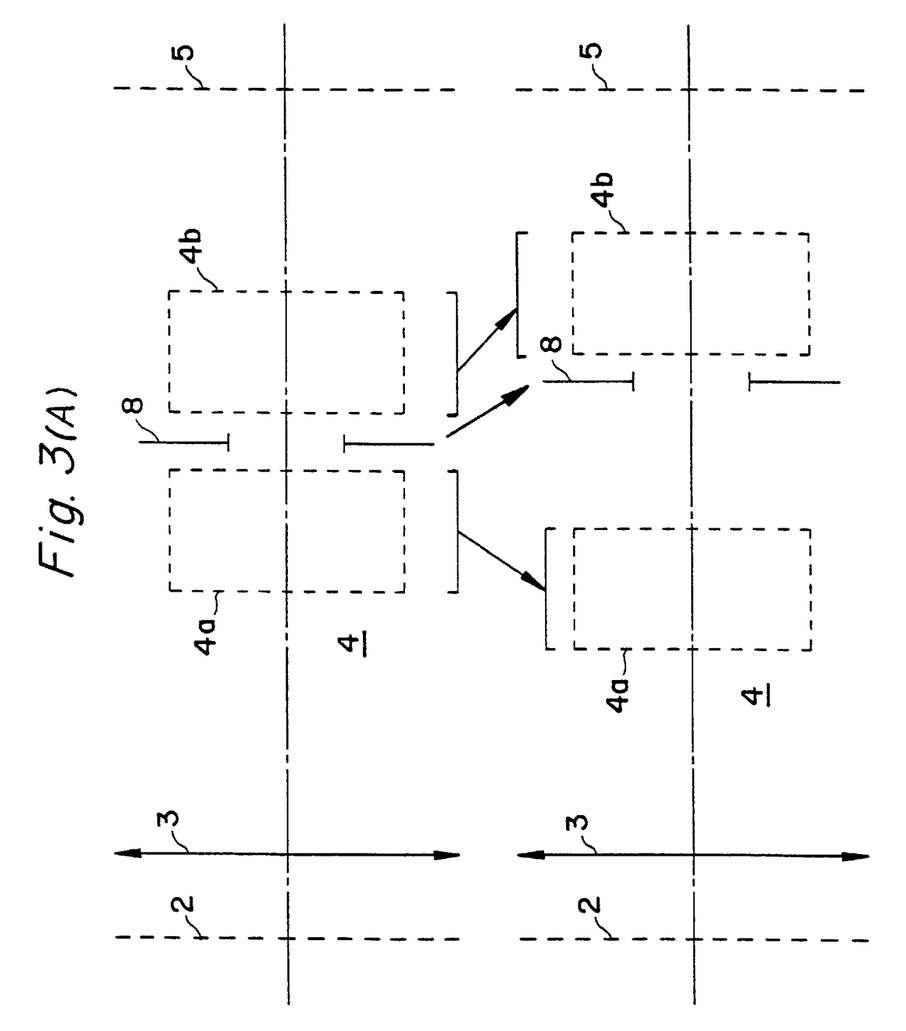
FIG. 3(A) is a schematic drawing of a third embodiment.

Alternatively, the aperture 8 may be fixed to and moved together with the first lens unit 4a. The objects of the present invention can also be achieved if the aperture 8 is constructed to move independently, as shown in FIG. 3(A). The movement of the aperture 8 need not necessarily be continuous: the key point is that the aperture should be able to be moved to a position that corresponds to the exit pupil of the image forming lens.

As explained above, in the relay lens system of the present invention, even where the various image forming lens that may be used to form the first image have various exit pupils, the entry pupil of the relay lens system can be changed in response to each particular exit pupil. Consequently, a second image can be formed that reproduces the first image while maintaining good quality. In addition, because the magnification of the relay lens system is fixed at all times and does not change, a second image can be formed with good quality relative to the first image formed by the image forming lens having various exit pupils.

Therefore, where the relay lens system of the present invention is applied in a video camera or SVC, the video camera or SVC that can use various image forming lenses as the image forming lens.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A relay lens system that re-forms as a second image a first image formed by an image forming lens, said relay lens system comprising:
   at least one lens;
   a first entry pupil and a second entry pupil that differs in location from the first entry pupil; and
   switching means for switching between these two entry pupils,
   wherein said relay lens system uses one of these two entry pupils by switching from one to the other, and a diameter of at least one of these entry pupils used by said relay lens system is adapted to be changed in diameter.

2. A relay lens system in accordance with claim 1, further comprising a field lens interposed between said at least one lens and said image forming lens.

3. A relay lens system in accordance with claim 2, wherein said field lens has a positive refractive power.

4. A relay lens system in accordance with claim 1, wherein said first and second entry pupils are formed by an aperture movable along an optical axis of said relay lens system.

5. A relay lens system in accordance with claim 4, wherein said at least one lens includes at least two movable lens units and said movable aperture is fixed to one of said two movable lens units.

6. A relay lens system in accordance with claim 4, wherein said at least one lens includes at least two movable lens units and said movable aperture is movable independently of both of said movable lens units.

7. A relay lens system that re-forms as a second image a first image formed by an image forming lens, said relay lens system comprising:
   at least one lens;
   a first entry pupil and a second entry pupil that differs in location from the first entry pupil, wherein said first and second entry pupils are formed by a plurality of apertures located at different locations along an optical axis of said relay lens system; and
   switching means for switching between these two entry pupils, wherein said relay lens system uses one of these two entry pupils by switching from one to the other, and a diameter of at least one of these entry pupils used by said relay lens system is adapted to be changed in diameter.

8. A relay lens system in accordance with claim 7, wherein said plurality of apertures are each adjustable in diameter.

9. A relay lens system that re-forms as a second image a first image formed by an image forming lens, said relay lens system comprising:

at least one lens;

a first entry pupil and a second entry pupil that differs in location from the first entry pupil;

means for receiving lens information transmitted from said image forming lens; and switching means for switching between these two entry pupils, wherein said relay lens system uses one of these two entry pupils by switching from one to the other, and a diameter of at least one of these pupils used by said relay lens system is adapted to be changed in diameter based on said lens information.

10. A relay lens system in accordance with claim 9, wherein said first and second entry pupils are formed by at least one aperture.

11. A relay lens system in accordance with claim 10, wherein said at least one aperture includes an aperture movable along an optical axis of said relay lens system.

12. A relay lens system in accordance with claim 11, wherein said at least one lens includes at least two movable lens units and said movable aperture is fixed to one of said two movable lens units.

13. A relay lens system in accordance with claim 11, wherein said at least one lens includes at least two movable lens units and said movable aperture is movable independently of both of said movable lens units.

14. A relay lens system in accordance with claim 11, wherein said movable aperture is movable to a position that corresponds to an exit pupil of the image forming lens.

15. A relay lens system that re-forms as a second image a first image formed by an image forming lens, said relay lens system comprising:

at least one lens;

a first entry pupil and a second entry pupil that differs in location from the first entry pupil, wherein said first and second entry pupils are formed by a plurality of apertures located at different locations along an optical axis of said relay lens systems;

means for receiving lens information transmitted from said image forming lens; and switching means for switching between these two entry pupils, wherein said relay lens system uses one of these two entry pupils by switching from one to the other, and a diameter of at least one of these pupils used by said relay lens system is adapted to be changed in diameter based on said lens information.

16. A relay lens system in accordance with claim 15, wherein said plurality of apertures are each adjustable in diameter.

17. A compact reduction/projection optical system comprising:

an image forming lens; and a relay lens system that re-forms as a second image a first image formed by said image forming lens, said relay lens system including at least one lens, a first entry pupil and a second entry pupil that differs in location from the first entry pupil, and switching means for switching between these two entry pupils, wherein said relay lens system uses one of these two entry pupils by switching from one to the other, and a diameter of at least one of these two entry pupils used by said relay lens system is adapted to be changed in diameter.

18. An optical system in accordance with claim 17, further comprising a field lens having a positive refractive power interposed between said relay lens system and said image forming lens.

19. An optical system in accordance with claim 17, further comprising:

means in said image forming lens for transmitting lens information; and means in said relay lens system for receiving lens information transmitted from said image forming lens, wherein said diameter of at least one of these entry pupils used by said relay lens system is changed in diameter based on said lens information.

20. An optical system in accordance with claim 17, wherein said first and second entry pupils are formed by a plurality of apertures located at different locations along an optical axis of said relay lens system.

21. An optical system in accordance with claim 17, wherein said first and second entry pupils are formed by an aperture movable along an optical axis of said relay lens system.

22. An optical system that re-forms as a second image a first image formed by an image forming lens, comprising:

a field lens for deflecting a light from the first image;

a relay lens system including at least two lenses and an aperture movable along an optical axis thereof and changeable in diameter, said aperture being provided between said two lenses in said relay lens system so that an entry pupil of the relay lens system can be moved along an optical axis of said relay lens system and can be changed in diameter.

* * * * *